(12) United States Patent
Blocksome et al.

(10) Patent No.: US 7,836,143 B2
(45) Date of Patent: Nov. 16, 2010

(54) MESSAGE COMMUNICATIONS OF PARTICULAR MESSAGE TYPES BETWEEN COMPUTE NODES USING DMA SHADOW BUFFERS

(75) Inventors: Michael A. Blocksome, Rochester, MN (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 11/739,948

(22) Filed: Apr. 25, 2007

(65) Prior Publication Data

US 2008/0270563 A1 Oct. 30, 2008

(51) Int. Cl.
G06F 15/167 (2006.01)
(52) U.S. Cl. .................................... 709/212
(58) Field of Classification Search ............. 370/85.13, 370/94.1, 363, 401, 402
See application file for complete search history.

(56) References Cited

U.S. PATENT DOCUMENTS

| | | | |
|---|---|---|---|
| 5,050,162 A | 9/1991 | Golestani | |
| 5,617,537 A | 4/1997 | Yamada et al. | |
| 5,680,116 A * | 10/1997 | Hashimoto et al. | 370/254 |
| 5,790,530 A * | 8/1998 | Moh et al. | 370/363 |
| 6,072,781 A | 6/2000 | Feeney et al. | |
| 6,105,122 A | 8/2000 | Muller et al. | |
| 7,155,541 B2 | 12/2006 | Ganapathy et al. | |
| 2003/0233497 A1 | 12/2003 | Shih | |
| 2005/0114561 A1 | 5/2005 | Lu et al. | |
| 2005/0198113 A1 | 9/2005 | Mohamed et al. | |
| 2006/0045005 A1 | 3/2006 | Blackmore et al. | |
| 2006/0045109 A1 | 3/2006 | Blackmore et al. | |
| 2006/0047771 A1 | 3/2006 | Blackmore et al. | |
| 2006/0056405 A1 | 3/2006 | Chang et al. | |
| 2006/0075057 A1 | 4/2006 | Gildea et al. | |
| 2006/0206635 A1 | 9/2006 | Alexander et al. | |
| 2006/0253619 A1 | 11/2006 | Torudbakken et al. | |
| 2008/0109573 A1 | 5/2008 | Leonard et al. | |
| 2008/0222317 A1 | 9/2008 | Go et al. | |

OTHER PUBLICATIONS

Office Action Dated Sep. 18, 2009 in U.S. Appl. No. 11/829,334.

(Continued)

*Primary Examiner*—Thu Nguyen
*Assistant Examiner*—Nam Tran
(74) *Attorney, Agent, or Firm*—Biggers & Ohanian, LLP; James R. Nock

(57) ABSTRACT

Message communications of particular message types between compute nodes using DMA shadow buffers includes: receiving a buffer identifier specifying an application buffer having a message of a particular type for transmission to a target compute node through a network; selecting one of a plurality of shadow buffers for a DMA engine on the compute node for storing the message, each shadow buffer corresponding to a slot of an injection FIFO buffer maintained by the DMA engine; storing the message in the selected shadow buffer; creating a data descriptor for the message stored in the selected shadow buffer; injecting the data descriptor into the slot of the injection FIFO buffer corresponding to the selected shadow buffer; selecting the data descriptor from the injection FIFO buffer; and transmitting the message specified by the selected data descriptor through the data communications network to the target compute node.

18 Claims, 7 Drawing Sheets

OTHER PUBLICATIONS

Office Action Dated Sep. 15, 2009 in U.S. Appl. No. 11/829,339.
Office Action Dated Nov. 24, 2009 in U.S. Appl. No. 11/829,325.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.

* cited by examiner

MESSAGE COMMUNICATIONS OF PARTICULAR MESSAGE TYPES BETWEEN COMPUTE NODES USING DMA SHADOW BUFFERS

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for message communications of particular message types between compute nodes using DMA shadow buffers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modem processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

When a parallel application running on a compute node transmits a message to another compute node connected to the data communications network, the application typically provides messaging software with a pointer to an application buffer storing the message. The messaging software describes the message in the application buffer to a direct memory access ('DMA') engine, which in turn, sends the message through the network using a DMA transfer. The drawback to this current method of transmitting messages, however, is that the application must typically monitor for the completion of the transfer to free up the application buffer for use with another operation after the transfer is complete regardless of whether the application needs to know that the transfer is complete. Having the application needlessly monitor for completion of the transfer increases the processing overhead and resources required to effect message transmission. Current solutions that eliminate the need for the application to monitor message transmission typically include having the messaging software allocate a temporary buffer that stores a copy of the message for transmission. After the messaging software copies the message into the temporary buffer, the application may free up the application buffer without having to monitor for completion of the message transfer. This current solution, however, also has drawbacks because the overhead for allocating a temporary buffer is excessive when a message for transmission is generally small in size such as, for example, control messages. As such, readers will appreciate that room for improvement exists in message communications of particular message types between compute nodes.

SUMMARY OF THE INVENTION

Methods, apparatus, and products are disclosed for message communications of particular message types between compute nodes using DMA shadow buffers. Embodiments includes: receiving, in an origin messaging module on an origin compute node, a buffer identifier specifying an application buffer having a message of a particular message type for transmission to a target compute node through a data communications network; selecting, by the origin messaging module, one of a plurality of shadow buffers for an origin direct memory access ('DMA') engine on the origin compute node for storing the message, each shadow buffer corresponding to a slot of an injection first-in-first-out ('FIFO') buffer maintained by the origin DMA engine for storing data descriptors specifying messages stored in that shadow buffer; storing, by the origin messaging module, the message in the selected shadow buffer; creating, by the origin messaging module, a data descriptor for the message stored in the selected shadow buffer; injecting, by the origin messaging module, the data descriptor into the slot of the injection FIFO buffer corresponding to the selected shadow buffer; selecting, by the origin DMA engine, the data descriptor from the injection FIFO buffer; and transmitting, by the origin DMA engine to the target compute node, the message specified by the selected data descriptor through the data communications network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
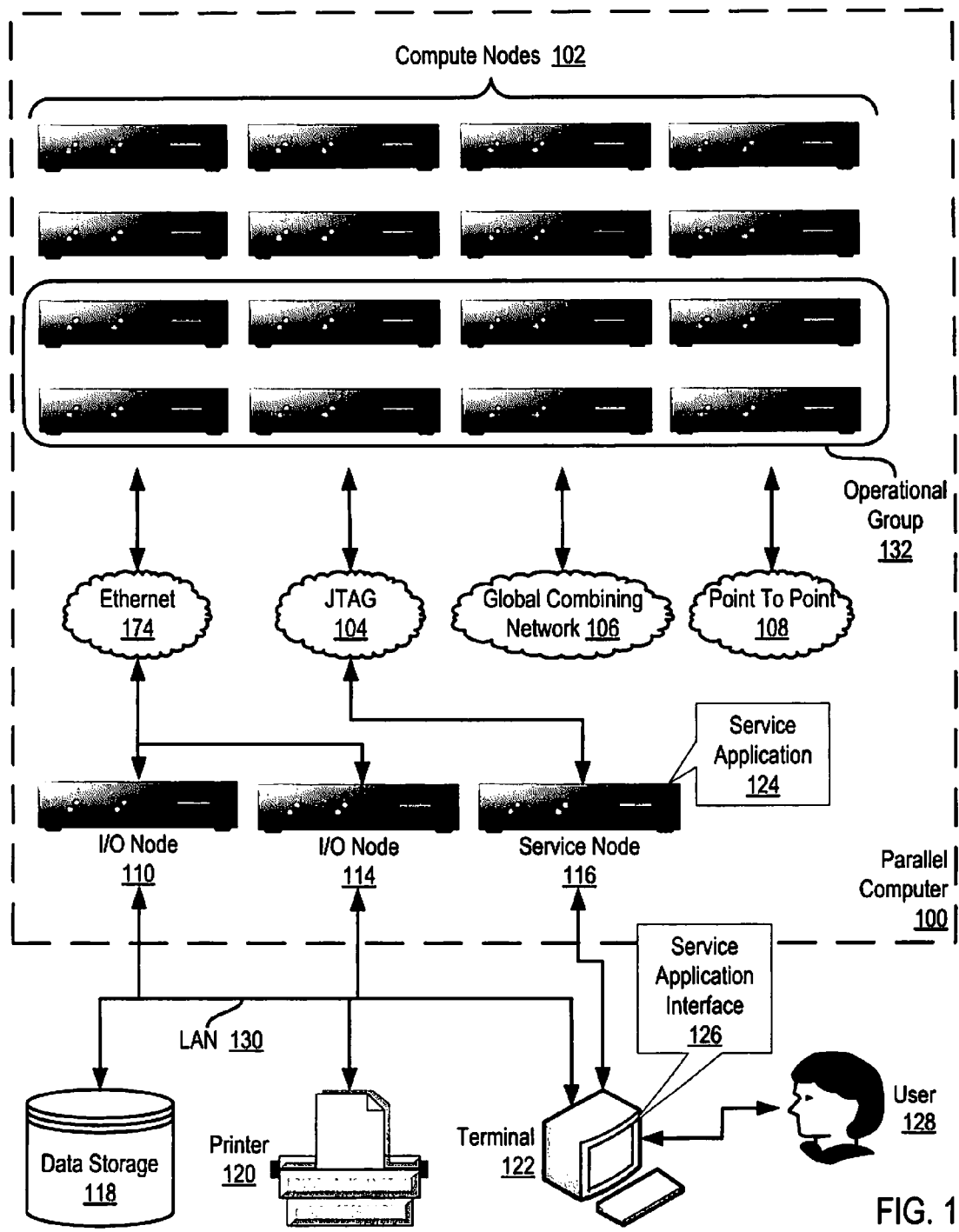
FIG. 1 illustrates an exemplary system for message communications of particular message types between compute nodes using DMA shadow buffers according to embodiments of the present invention.

Exemplary methods, apparatus, and computer program products for message communications of particular message types between compute nodes using DMA shadow buffers according to embodiments of the present invention are described with reference to the accompanying drawings, beginning with FIG. 1. FIG. 1 illustrates an exemplary system for message communications of particular message types between compute nodes using DMA shadow buffers according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for message communications of particular message types between compute nodes using DMA shadow buffers according to embodiments of the present invention. The system of FIG. 1 operates generally to for message communications of particular message types between compute nodes using DMA shadow buffers according to embodiments of the present invention by: receiving, in an origin messaging module on an origin compute node, a buffer identifier specifying an application buffer having a message of a particular message type for transmission to a target compute node through a data communications network; selecting, by the origin messaging module, one of a plurality of shadow buffers for an origin DMA engine on the origin compute node for storing the message, each shadow buffer corresponding to a slot of an injection first-in-first-out ('FIFO') buffer maintained by the origin DMA engine for storing data descriptors specifying messages stored in that shadow buffer; storing, by the origin messaging module, the message in the selected shadow buffer; creating, by the origin messaging module, a data descriptor for the message; injecting, by the origin messaging module, the data descriptor into the slot of the injection FIFO buffer corresponding to the selected shadow buffer; selecting, by the origin DMA engine, the data descriptor from the injection FIFO buffer; and transmitting, by the origin DMA engine to the target compute node, the message specified by the selected data descriptor through the data communications network. Readers will note that the origin compute node is a compute node attempting to transmit a message, while the target compute node is a compute node intended as the recipient of the message.

The arrangement of nodes, networks, and I/O devices making up the exemplary system illustrated in FIG. 1 are for explanation only, not for limitation of the present invention. Data processing systems capable of message communications of particular message types between compute nodes using DMA shadow buffers according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of message communications of particular message types between compute nodes using DMA shadow buffers according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Message communications of particular message types between compute nodes using DMA shadow buffers according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of message communications of particular message types between compute nodes using DMA shadow buffers according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
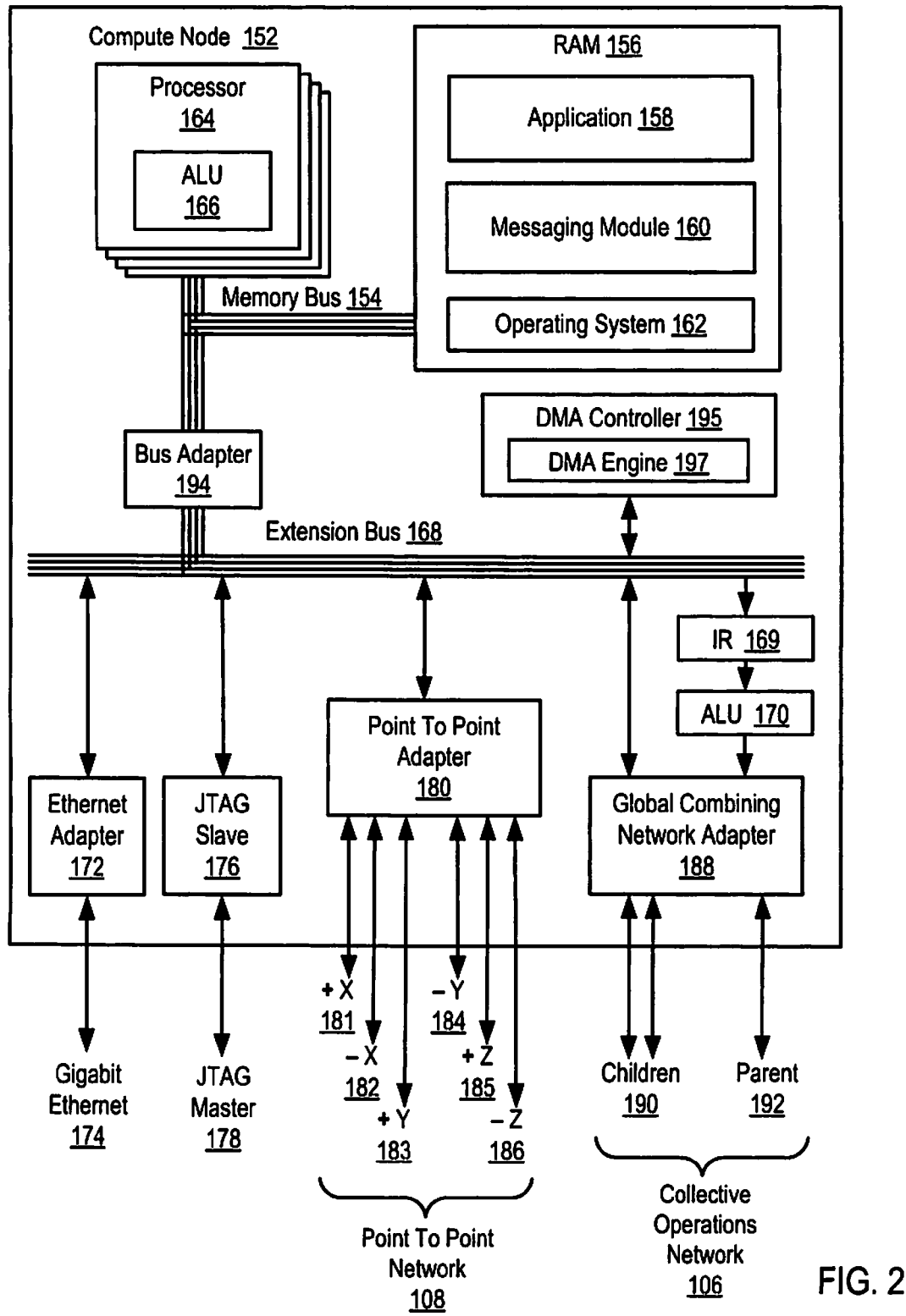
FIG. 2 sets forth a block diagram of an exemplary compute node useful in a parallel computer capable of message communications of particular message types between compute nodes using DMA shadow buffers according to embodiments of the present invention.

In the example of FIG. 2, the messaging module (160) operates generally for message communications of particular message types between compute nodes using DMA shadow buffers according to embodiments of the present invention. The messaging module (160) of FIG. 2 operates generally for message communications of particular message types between compute nodes using DMA shadow buffers according to embodiments of the present invention by: receiving a buffer identifier specifying an application buffer having a message of a particular message type for transmission to a target compute node through a data communications network; selecting one of a plurality of shadow buffers for a direct memory access ('DMA') engine (197) on the compute node (152) for storing the message, each shadow buffer corresponding to a slot of an injection first-in-first-out ('FIFO') buffer maintained by the DMA engine (197) for storing data descriptors specifying messages stored in that shadow buffer; storing the message in the selected shadow buffer; creating a data descriptor for the message; and injecting the data descriptor into the slot of the injection FIFO buffer corresponding to the selected shadow buffer.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for message communications of particular message types between compute nodes using DMA shadow buffers according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: it typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in message communications of particular message types between compute nodes using DMA shadow buffers according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiate the DMA transfer, the CPU does not execute it. The DMA engine (195) of FIG. 2 is improved for message communications of particular message types between compute nodes using DMA shadow buffers according to embodiments of the present invention. The DMA engine (195) of FIG. 2 is operates generally for message communications of particular message types between compute nodes using DMA shadow buffers according to embodiments of the present invention by selecting a data descriptor from an injection FIFO buffer for the DMA engine (197) and transmitting the message specified by the selected data descriptor through the data communications network (108) to a target compute node.

Figure 3A:
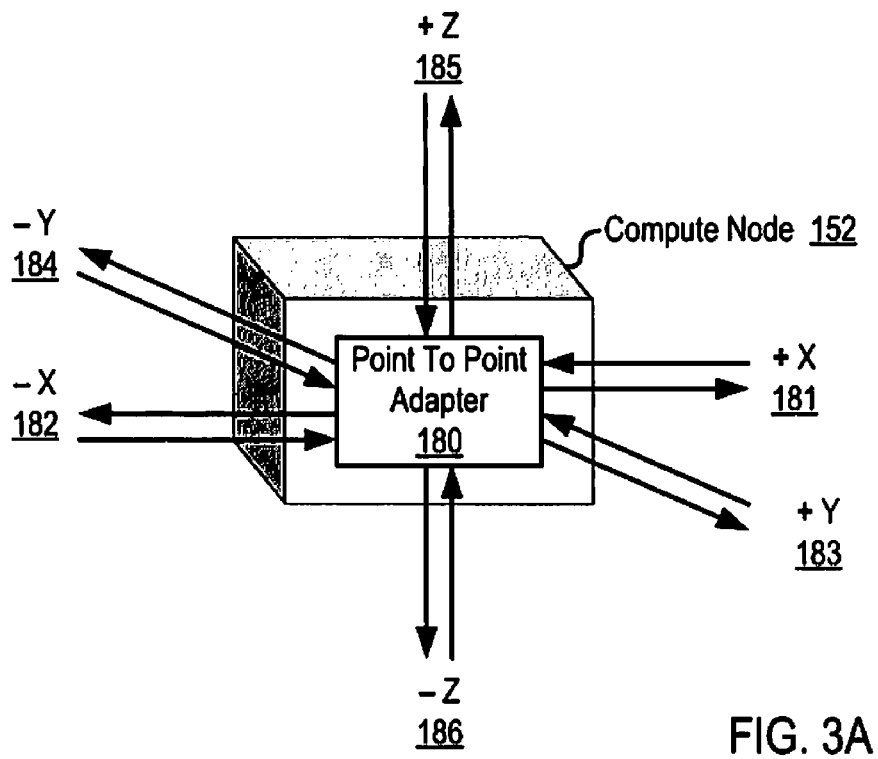
FIG. 3A illustrates an exemplary Point To Point Adapter useful in systems capable of message communications of particular message types between compute nodes using DMA shadow buffers according to embodiments of the present invention.

For further explanation, FIG. 3A illustrates an exemplary Point To Point Adapter (180) useful in systems capable of message communications of particular message types between compute nodes using DMA shadow buffers according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
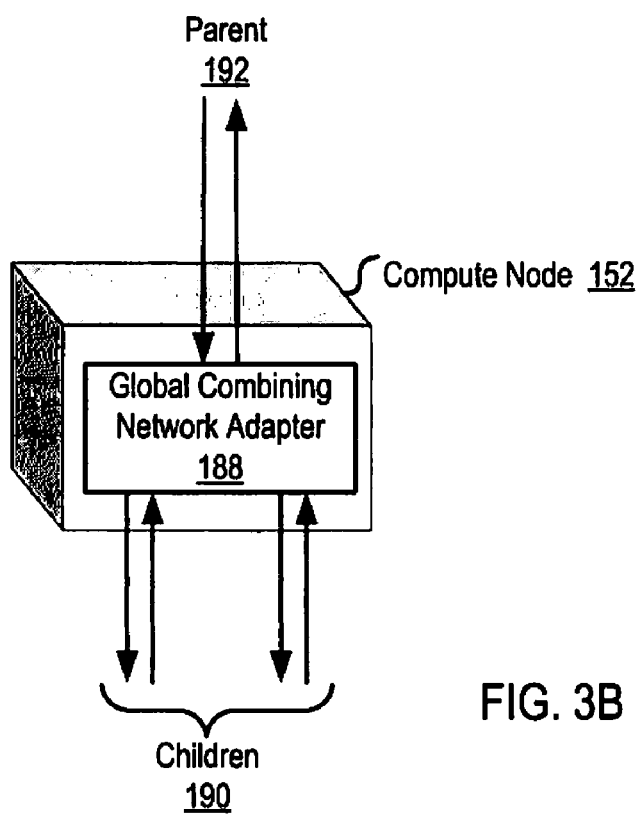
FIG. 3B illustrates an exemplary Global Combining Network Adapter useful in systems capable of message communications of particular message types between compute nodes using DMA shadow buffers according to embodiments of the present invention.

For further explanation, FIG. 3B illustrates an exemplary Global Combining Network Adapter (188) useful in systems capable of message communications of particular message types between compute nodes using DMA shadow buffers according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
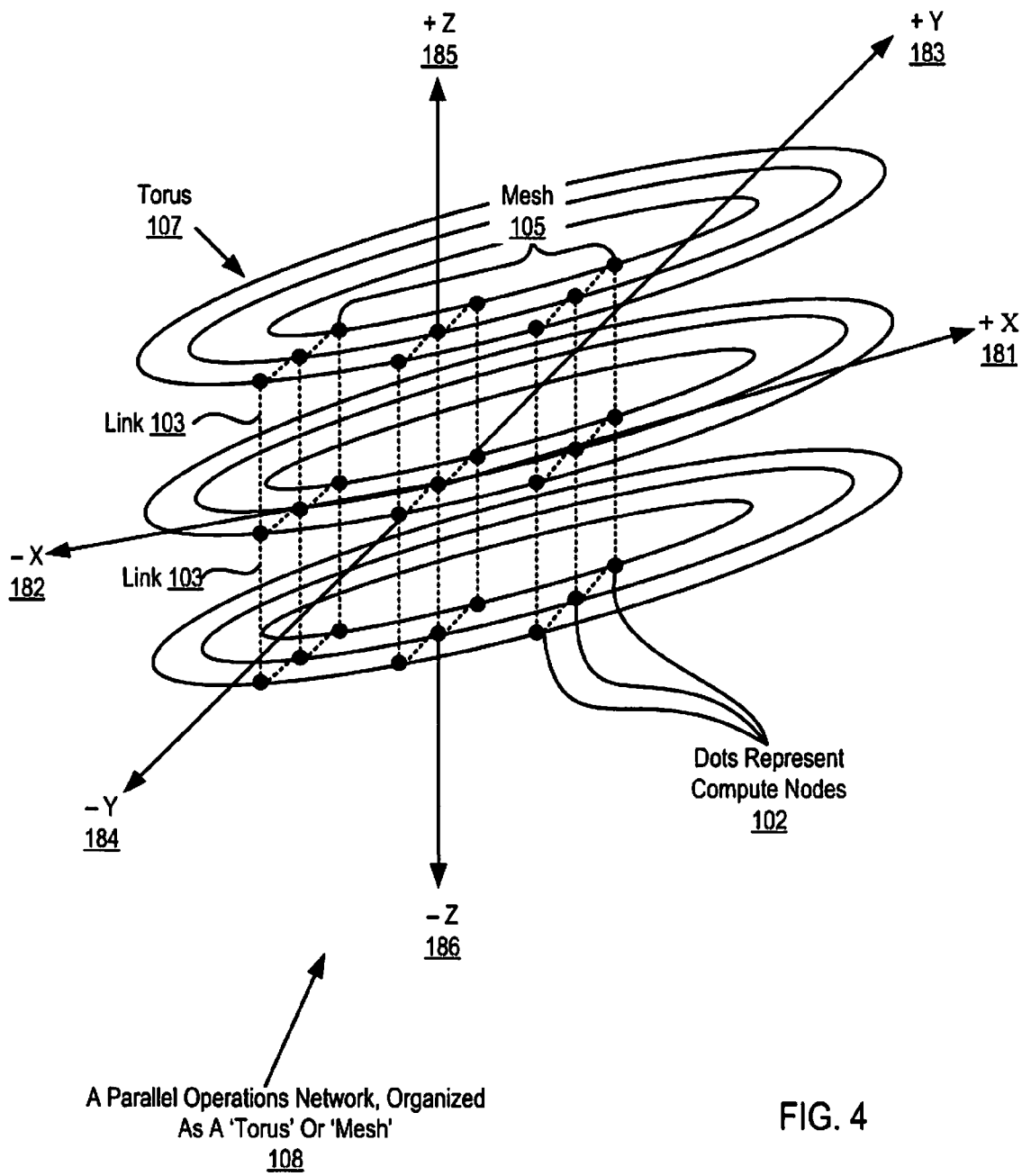
FIG. 4 sets forth a line drawing illustrating an exemplary data communications network optimized for point to point operations useful in systems that communicate particular message types between compute nodes using DMA shadow buffers in accordance with embodiments of the present invention.

For further explanation, FIG. 4 sets forth a line drawing illustrating an exemplary data communications network (108) optimized for point to point operations useful in systems that communicate particular message types between compute nodes using DMA shadow buffers in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in message communications of particular message types between compute nodes using DMA shadow buffers in accordance with embodiments of the present invention may contain only a few compute nodes or may contain thousands of compute nodes.

Figure 5:
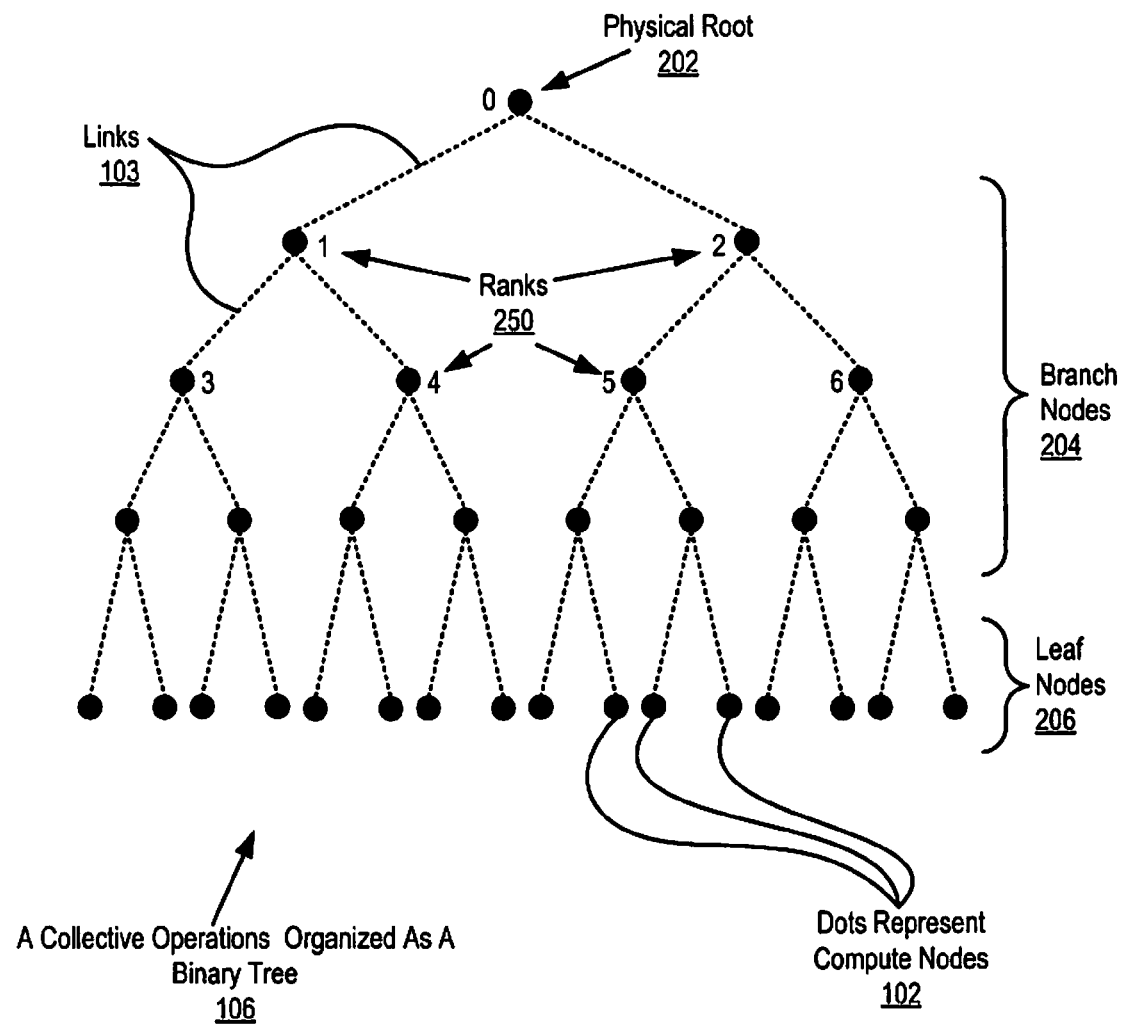
FIG. 5 sets forth a line drawing illustrating an exemplary data communications network optimized for collective operations useful in systems that communicate particular message types between compute nodes using DMA shadow buffers in accordance with embodiments of the present invention.

For further explanation, FIG. 5 sets forth a line drawing illustrating an exemplary data communications network (106) optimized for collective operations useful in systems that communicate particular message types between compute nodes using DMA shadow buffers in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for message communications of particular message types between compute nodes using DMA shadow buffers accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
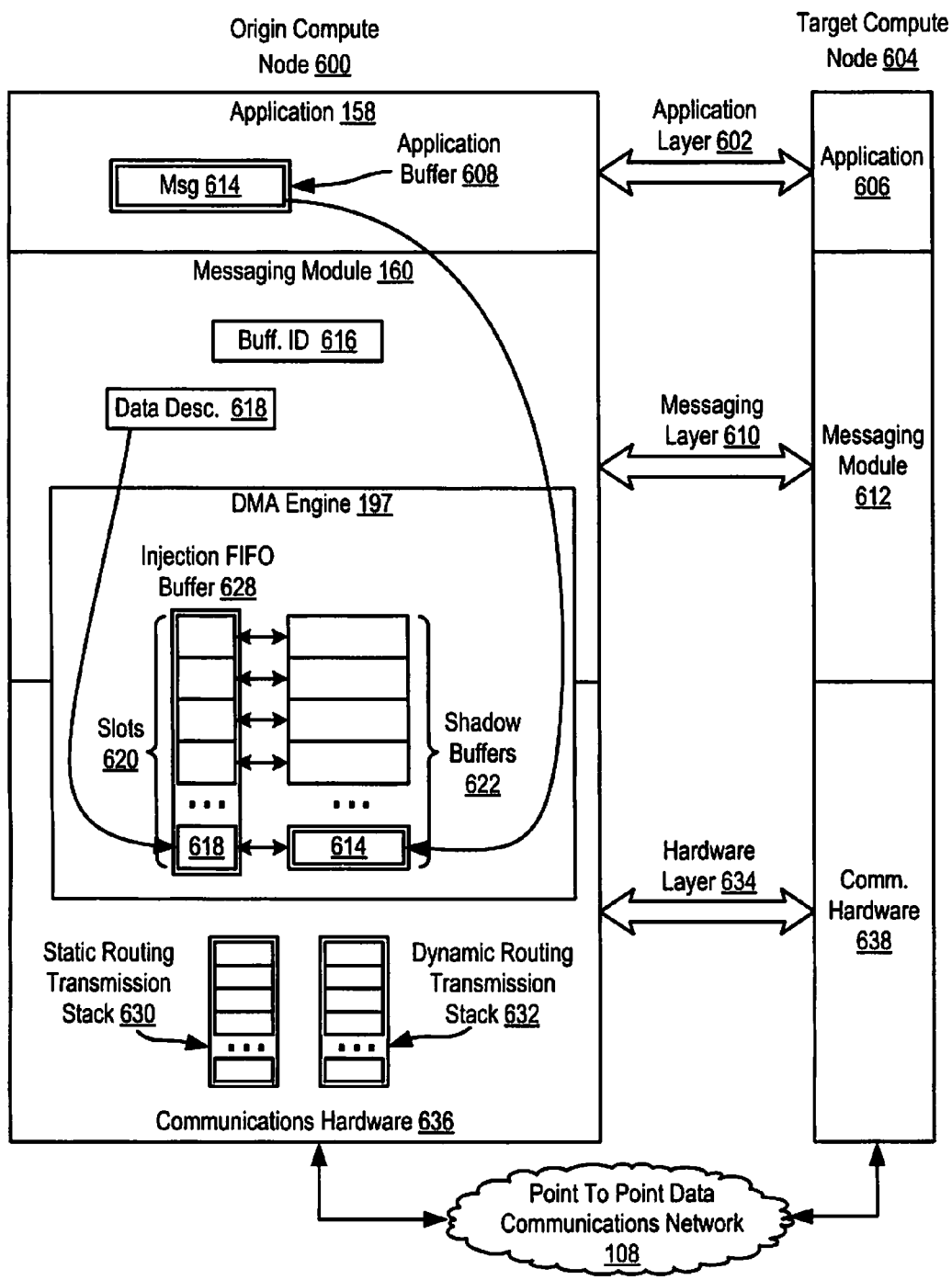
FIG. 6 sets forth a block diagram illustrating an exemplary communications architecture illustrated as a protocol stack useful in message communications of particular message types between compute nodes using DMA shadow buffers according to embodiments of the present invention.

For further explanation, FIG. 6 sets forth a block diagram illustrating an exemplary communications architecture illustrated as a protocol stack useful in message communications of particular message types between compute nodes using DMA shadow buffers according to embodiments of the present invention. The exemplary communications architecture of FIG. 6 sets forth two compute nodes, origin compute node (600) and target compute node (604). Only two compute nodes are illustrated in the example of FIG. 6 for ease of explanation and not for limitation. In fact, message communications of particular message types between compute nodes using DMA shadow buffers according to embodiments of the present invention may be implemented using many compute nodes in very large scale computer systems such as parallel computers with thousands of nodes.

The exemplary communications architecture of FIG. 6 includes an application layer (602) composed of application (158) installed on the origin compute node (600) and application (606) installed on the target compute node (604). In the example of FIG. 6, the application (158) includes an application buffer (608) for storing a message (614) for transmission to application (606) installed on the target compute node (604). The message (614) is a message of a particular message type such as, for example, a control message. A control message is a type of message that is typically small in size and used to administer or provide information regarding the transmission of other messages. An example of a control message may include an acknowledgement message confirming the receipt of a previously received message. Data communications between applications (158, 606) are effected using messaging modules (160, 612) installed on each of the compute nodes (600, 604). Applications (158) may communicate messages by invoking function of an application programming interfaces ('API') exposed by the application messaging modules (606 and 612). To transmit message (614) to the application (606), the application (158) of FIG. 6 may invoke a function of an API for messaging module (160) that passes a buffer identifier (616) specifying the application buffer (608) to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin compute node (600) and messaging module (612) installed on the target compute node (604). In the example of FIG. 6, the messaging module (160) operates for message communications of particular message types between compute nodes using DMA shadow buffers according to embodiments of the present invention. The messaging module (160) of FIG. 6 receives the buffer identifier (616) specifying the application buffer (608) having a message (614) of a particular message type for transmission to a target compute node (604) through a data communications network (108). The messaging module (160) of FIG. 6 selects one of a plurality of shadow buffers for a direct memory access ('DMA') engine (197) on the origin compute node for storing the message (614). Each shadow buffer (622) corresponds to a slot (620) of an injection first-in-first-out ('FIFO') buffer (628) maintained by the origin DMA engine (197) for storing data descriptors specifying messages stored in that shadow buffer. The messaging module (160) of FIG. 6 stores the message (614) in the selected shadow buffer (704). The messaging module (160) of FIG. 6 also creates a data descriptor (618) for the message (614). A data descriptor is a data structure that describes a message for transmission and specifies transmission data related to the message. For example, a data descriptor may describe the address of the buffer storing the message and the size of the message and may specify the particular message type of the message and the packet headers to be used in transmitting the message. In the example of FIG. 6, the data descriptor (618) specifies, among other things, that the message is stored in one of the shadow buffers (622) for the DMA engine (197). The messaging module (160) of FIG. 6 injects the data descriptor (618) into the slot (620) of the injection FIFO buffer (628) corresponding to the selected shadow buffer.

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters as described above with reference to FIGS. 2 and 3A.

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in message communications of particular message types between compute nodes using DMA shadow buffers according to embodiments of the present invention may often provide messaging layer interfaces and also implement communications according to some aspects of the communication hardware layer (634). The exemplary DMA engine (197) of FIG. 6 includes an injection FIFO buffer (628) having slots (620) for storing data descriptors for messages to be sent to other DMA engines on other compute nodes using a memory FIFO data transfer operation or direct put data transfer operation. Although not shown, the exemplary DMA engine (197) of FIG. 6 also includes a number of reception FIFO buffers for storing data descriptors for messages received from other DMA engines on other compute nodes. Although FIG. 6 only illustrates a single injection FIFO buffer (628), readers will note that a DMA engine may have access to any number of injection FIFO buffers and reception FIFO buffers.

A memory FIFO data transfer operation is a mode of transferring data using a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

As mentioned above, each slot (620) of the injection FIFO buffer (628) corresponds to a shadow buffer (622). Each shadow buffer (622) is typically the same size and is large enough to hold messages having the same message type as the message (614). The relationship between each slot (620) and its corresponding shadow buffer (622) dictates that a data descriptor stored in a particular slot (620) specifies a message that is stored in the shadow buffer (622) corresponding to the slot (620).

The DMA engine (197) of FIG. 6 is also capable of message communications of particular message types between compute nodes using DMA shadow buffers according to the present invention. The DMA engine (197) of FIG. 6 selects the data descriptor (618) from the injection FIFO buffer (628) and transmits the message (614) specified by the selected data descriptor (618) through the data communications network (108) to the target compute node (604). The DMA engine (197) of FIG. 6 transmits the message (614) specified by the selected data descriptor (618) through the data communications network (108) to the target compute node (604) by encapsulating portions of the message (614) into data packets and injecting the data packets into transmission stacks (630, 632) in the communications hardware (636). The communications hardware (636) of FIG. 6 includes a static routing transmission stack (630) that stores packets for transmission through the data communications network (108) using static routing. The communications hardware (636) of FIG. 6 also includes a dynamic routing transmission stack (632) that stores packets for transmission through the data communications network (108) using dynamic routing.

Figure 7:
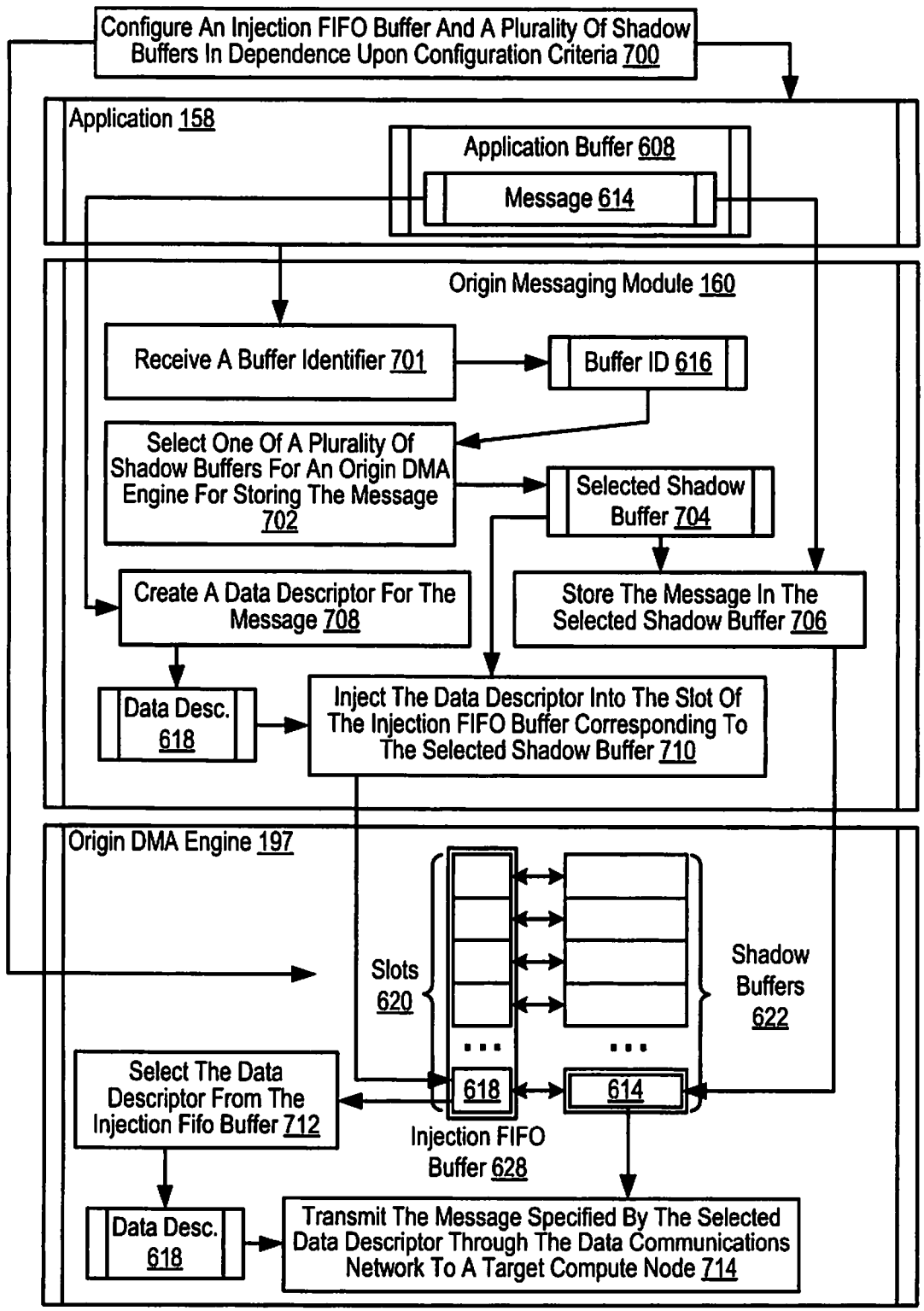
FIG. 7 sets forth a flow chart illustrating an exemplary method for message communications of particular message types between compute nodes using DMA shadow buffers according to the present invention.

For further explanation, FIG. 7 sets forth a flow chart illustrating an exemplary method for message communications of particular message types between compute nodes using DMA shadow buffers according to the present invention. The method of FIG. 7 includes configuring (700) an injection FIFO buffer (628) and the plurality of shadow buffers (622) in dependence upon configuration criteria. The injection FIFO buffer (628) is a buffer having slots for storing data descriptors of messages to be sent to other DMA engines on other compute nodes using a memory FIFO data transfer operation or direct put data transfer operation. Each of the shadow buffers (622) is a buffer maintained by the DMA engine (197) and corresponds to one of the slots in the injection FIFO buffer (628). Each shadow buffer (622) is typically the same size and is large enough to hold messages of a particular message type, that is messages who size does not often vary so as to enable the shadow buffers (622) to be configured for a fixed size large enough to store the messages. The shadow buffers (622) are so called because each buffer (622) shadows one of the slots (620) in the injection FIFO buffer (628). The relationship between each slot (620) and its corresponding shadow buffer (622) dictates that a data descriptor stored in a particular slot (620) specifies a message that is store in the shadow buffer (622) corresponding to the slot (620).

The configuration criteria used to configure the injection FIFO buffer (628) and the plurality of shadow buffers (622) may specify aspects of the injection FIFO buffer (628) and the shadow buffers (622) such as, for example, the size of the slots (620) in the injection FIFO buffer (628), the size of the shadow buffers (622), the number of slots (620) in the injection FIFO buffer (628), and the number of shadow buffers (622). The configuration criteria may specify such attributes of the injection FIFO buffer (628) and the plurality of shadow buffers (622) based on requirements of the application (158), historical application performance, the size of data descriptors stored in the slots (620) of the injection FIFO buffer (628), the size of messages having a particular message type to be transmitted using the shadow buffers (622), network congestion, and any other factors are will occur to those of skill in the art. In the example of FIG. 7, the shadow buffers (622) are configured to have a size large enough to store control messages such as, for example, an acknowledgement message. In the example of FIG. 7 illustrating message communications of particular message types between compute nodes using DMA shadow buffers according to embodiments of the present invention, therefore, the particular message type of messages communicated is a control message type. Readers will note, however, that such an example is for explanation only and not for limitation.

Although the origin DMA engine (197) is used to send many different types of messages and maintains other injection FIFO buffers (not shown), the injection FIFO buffer (628) of FIG. 7 is maintained by the origin DMA engine (197) exclusively for messages of the control message type and assigned a processing priority. That is, only data descriptors for messages having a control message type are stored in the injection FIFO buffer (628) of FIG. 7. The processing priority assigned to the injection FIFO buffer (628) may be higher or lower than the other injection FIFO buffers maintained by the origin DMA engine (197). The origin DMA engine (197) may assign a higher processing priority to the injection FIFO buffer (628) than the other injection FIFO buffers by polling the injection FIFO buffer (628) for data descriptor more often than the other buffers or spending more time processing the data descriptors in the injection FIFO buffer (628) than the other injection FIFO buffers. The origin DMA engine (197) may assign a lower processing priority to the injection FIFO buffer (628) than the other injection FIFO buffers by polling the injection FIFO buffer (628) for data descriptor less often than the other buffers or spending less time processing the data descriptors in the injection FIFO buffer (628) than the other injection FIFO buffers. The above manner of assigning processing priority to the injection FIFO buffer (628) is for explanation only and not for limitation. Other ways of assigning processing priority to the injection FIFO buffer (628) as will occur to those of skill in the art are also well within the scope of the present invention.

In addition to being designated exclusively for use in transmitting control message, the injection FIFO buffer (628) may be designated for static routing. That is, the origin DMA engine (197) may transmit all the messages whose data descriptors are stored in the injection FIFO buffer (628) using static routing. Static routing ensures that all the packets used to transmit a particular message take the same path through the network to the target compute node and, therefore, arrive in the order in which the packets were transmitted by the origin compute node. Similarly, the injection FIFO buffer (628) may be designated for dynamic routing. That is, the origin DMA engine (197) may transmit all the messages whose data descriptors are stored in the injection FIFO buffer (628) using dynamic routing. Dynamic routing allows each of the packets used to transmit a particular message to take any path through the network to the target compute node, typically the most efficient network path, and, therefore, the packets may arrive out of order compared to the order in which the packets were transmitted.

The method of FIG. 7 includes receiving (701), in an origin messaging module (160) on an origin compute node, a buffer identifier (616) specifying an application buffer (608) having a message (614) of a particular message type for transmission to a target compute node through a data communications network. The origin messaging module (160) of FIG. 7 may receive (701) a buffer identifier (616) specifying an application buffer (608) having a message (614) according to the method of FIG. 7 when the application (158) calls a function of a messaging module API exposed to support messaging among applications installed on compute nodes.

The method of FIG. 7 also includes selecting (702), by the origin messaging module (160), one of a plurality of shadow buffers (622) for an origin DMA engine (197) on the origin compute node for storing the message (614). As mentioned above, each shadow buffer (622) of FIG. 7 corresponds to a slot (620) of the injection FIFO buffer (628) maintained by the origin DMA engine (197) for storing data descriptors specifying messages stored in that shadow buffer. The origin messaging module (160) may select (702) one of a plurality of shadow buffers (622) for an origin DMA engine (197) on the origin compute node for storing the message (614) according to the method of FIG. 7 by identifying the next slot available for storing a data descriptor in the injection FIFO buffer (628) and selecting the shadow buffer (704) corresponding to the identified slot.

The method of FIG. 7 includes storing (706), by the origin messaging module (160), the message (614) in the selected shadow buffer (704). The selected shadow buffer (704) of FIG. 7 may be implemented as a pointer to one of the shadow buffers (622) maintained by the origin DMA engine (197). The origin messaging module (160) may store (706) the message (614) in the selected shadow buffer (704) according to the method of FIG. 7 by copying the message (614) stored in the application buffer (608) identified by the buffer identifier (616) into the selected shadow buffer (704). Storing (706) the message (614) in the selected shadow buffer (704) advantageously eliminates the need for the application (158) to monitor for completion of the message transfer before freeing up the space allocated to application buffer (608).

The method of FIG. 7 also includes creating (708), by the origin messaging module (160), a data descriptor (618) for the message (614) stored in the selected shadow buffer (704). The data descriptor (618) of FIG. 7 represents a data structure that describes the message (614) for transmission and specifies transmission data related to the message (614). For example, a data descriptor may describe the address of the buffer storing the message and the size of the message and may specify the particular message type of the message and the packet headers to be used in transmitting the message. In the example of FIG. 7, the data descriptor (618) specifies, among other things, that the message (614) is stored in one of the shadow buffers (622) for the DMA engine (197).

The method of FIG. 7 includes injecting (710), by the origin messaging module (160), the data descriptor (618) into the slot (620) of the injection FIFO buffer (628) corresponding to the selected shadow buffer (704). The origin messaging module (160) may inject (710) the data descriptor (618) according to the method of FIG. 7 by storing the data descriptor (618) into the slot (620) of the injection FIFO buffer (628) corresponding to the selected shadow buffer (704) and advancing the pointer that identifies the next available slot in the injection FIFO buffer for storing a data descriptor.

The method of FIG. 7 also includes selecting (712), by the origin DMA engine (197), the data descriptor (618) from the injection FIFO buffer (628). The origin DMA engine (197) may select (712) the data descriptor (618) from the injection FIFO buffer (628) according to the method of FIG. 7 by retrieving the data descriptor (618) from the injection FIFO buffer (628) and advancing the pointer that identifies the next slot in the injection FIFO buffer for processing.

The method of FIG. 7 includes transmitting (712), by the origin DMA engine (197) to the target compute node, the message (614) specified by the selected data descriptor (618) through the data communications network. The origin DMA engine (197) may transmit (712) the message (614) specified by the selected data descriptor (618) to the target compute node according to the method of FIG. 7 by retrieving the message (614) from the shadow buffer (620), packetizing the message (614) into network packets using the header provided in the data descriptor (618) for the message (614), and injecting the network packets in a transmission stack of the network adapter providing a network interface to the compute node. As mentioned above, the injection FIFO buffer (628) may be designated for static routing or dynamic routing. When the injection FIFO buffer (628) is designated for static routing, the origin DMA engine (197) may transmit (712) the message (614) according to the method of FIG. 7 by transmitting the message (614) using static routing. The origin DMA engine (197) may transmit (712) the message (614) using static routing by setting a flag in the header of each network packet containing a portion of the message (614) that indicates static routing is to be used and injecting each network packet into a designated static routing transmission stack of the network adapter of the compute node or injecting each network packet into the same transmission stack of the network adapter, such as, for example, the transmission stack for the 'X+' direction in the torus network. When the injection FIFO buffer (628) is designated for dynamic routing, the origin DMA engine (197) may transmit (712) the message (614) according to the method of FIG. 7 by transmitting the message (614) using dynamic routing. The origin DMA engine (197) may transmit (712) the message (614) using dynamic routing by setting a flag in the header of each network packet containing a portion of the message (614) that indicates dynamic routing is to be used and injecting each network packet into a designated dynamic routing transmission stack of the network adapter of the compute node or injecting each network packet into whichever transmission stack of the network adapter has the least number of packets for processing.

Exemplary embodiments of the present invention are described largely in the context of a fully functional computer system for message communications of particular message types between compute nodes using DMA shadow buffers. Readers of skill in the art will recognize, however, that the present invention also may be embodied in a computer program product disposed on computer readable media for use with any suitable data processing system. Such computer readable media may be recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for message communications of particular message types between compute nodes using DMA shadow buffers, the method comprising:
receiving, in an origin messaging module on an origin compute node, a buffer identifier specifying an application buffer having a message of a particular message type for transmission to a target compute node through a data communications network;
selecting, by the origin messaging module, one of a plurality of shadow buffers for an origin direct memory access ('DMA') engine on the origin compute node for storing the message, each shadow buffer corresponding to a slot of an injection first-in-first-out ('FIFO') buffer maintained by the origin DMA engine for storing data descriptors specifying messages stored in that shadow buffer;
storing, by the origin messaging module, the message in the selected shadow buffer;
creating, by the origin messaging module, a data descriptor for the message stored in the selected shadow buffer;
injecting, by the origin messaging module, the data descriptor into the slot of the injection FIFO buffer corresponding to the selected shadow buffer;
selecting, by the origin DMA engine, the data descriptor from the injection FIFO buffer; and
transmitting, by the origin DMA engine to the target compute node, the message specified by the selected data descriptor through the data communications network.

2. The method of claim 1 wherein:
the injection FIFO buffer is designated for static routing; and
transmitting, by the origin DMA engine to the target compute node, the message specified by the selected data descriptor through the data communications network further comprises transmitting the message using static routing.

3. The method of claim 1 wherein:
the injection FIFO buffer is designated for dynamic routing; and
transmitting, by the origin DMA engine to the target compute node, the message specified by the selected data descriptor through the data communications network further comprises transmitting the message using dynamic routing.

4. The method of claim 1 wherein:
the particular message type is a control message type;
the injection FIFO buffer is maintained by the origin DMA engine exclusively for messages of the control message type and assigned a processing priority.

5. The method of claim 1 further comprising configuring the injection FIFO buffer and the plurality of shadow buffers in dependence upon configuration criteria.

6. The method of claim 1 wherein the origin compute node and the target compute node are comprised in a parallel computer, the parallel computer comprising a plurality of compute nodes connected for data communications through the data communications network, the data communications network optimized for point to point data communications.

7. An origin compute node capable of message communications of particular message types between compute nodes using DMA shadow buffers, the compute node comprising a direct memory access ('DMA') controller, an origin DMA engine installed upon the DMA controller, a computer processor, computer memory operatively coupled to the computer processor, the DMA controller, and the origin DMA engine, the computer memory having disposed within it computer program instructions capable of:

receiving, in an origin messaging module on the origin compute node, a buffer identifier specifying an application buffer having a message of a particular message type for transmission to a target compute node through a data communications network;

selecting, by the origin messaging module, one of a plurality of shadow buffers for the origin DMA engine on the origin compute node for storing the message, each shadow buffer corresponding to a slot of an injection first-in-first-out ('FIFO') buffer maintained by the origin DMA engine for storing data descriptors specifying messages stored in that shadow buffer;

storing, by the origin messaging module, the message in the selected shadow buffer;

creating, by the origin messaging module, a data descriptor for the message stored in the selected shadow buffer;

injecting, by the origin messaging module, the data descriptor into the slot of the injection FIFO buffer corresponding to the selected shadow buffer;

selecting, by the origin DMA engine, the data descriptor from the injection FIFO buffer; and transmitting, by the origin DMA engine to the target compute node, the message specified by the selected data descriptor through the data communications network.

8. The origin compute node of claim 7 wherein:
the injection FIFO buffer is designated for static routing; and
transmitting, by the origin DMA engine to the target compute node, the message specified by the selected data descriptor through the data communications network further comprises transmitting the message using static routing.

9. The origin compute node of claim 7 wherein:
the injection FIFO buffer is designated for dynamic routing; and
transmitting, by the origin DMA engine to the target compute node, the message specified by the selected data descriptor through the data communications network further comprises transmitting the message using dynamic routing.

10. The origin compute node of claim 7 wherein:
the particular message type is a control message type;
the injection FIFO buffer is maintained by the origin DMA engine exclusively for messages of the control message type and assigned a processing priority.

11. The origin compute node of claim 7 wherein the computer memory also has disposed within it computer program instructions capable of configuring the injection FIFO buffer and the plurality of shadow buffers in dependence upon configuration criteria.

12. The origin compute node of claim 7 wherein the origin compute node and the target compute node are comprised in a parallel computer, the parallel computer comprising a plurality of compute nodes connected for data communications through the data communications network, the data communications network optimized for point to point data communications.

13. A computer program product for message communications of particular message types between compute nodes using DMA shadow buffers, the computer program product disposed upon a non-transitory computer readable medium, the computer program product comprising computer program instructions capable of:

receiving, in an origin messaging module on an origin compute node, a buffer identifier specifying an application buffer having a message of a particular message type for transmission to a target compute node through a data communications network;

selecting, by the origin messaging module, one of a plurality of shadow buffers for an origin direct memory access ('DMA') engine on the origin compute node for storing the message, each shadow buffer corresponding to a slot of an injection first-in-first-out ('FIFO') buffer maintained by the origin DMA engine for storing data descriptors specifying messages stored in that shadow buffer;

storing, by the origin messaging module, the message in the selected shadow buffer;

creating, by the origin messaging module, a data descriptor for the message stored in the selected shadow buffer;

injecting, by the origin messaging module, the data descriptor into the slot of the injection FIFO buffer corresponding to the selected shadow buffer;

selecting, by the origin DMA engine, the data descriptor from the injection FIFO buffer; and transmitting, by the origin DMA engine to the target compute node, the message specified by the selected data descriptor through the data communications network.

14. The computer program product of claim 13 wherein:
the injection FIFO buffer is designated for static routing; and
transmitting, by the origin DMA engine to the target compute node, the message specified by the selected data descriptor through the data communications network further comprises transmitting the message using static routing.

15. The computer program product of claim 13 wherein:
the injection FIFO buffer is designated for dynamic routing; and
transmitting, by the origin DMA engine to the target compute node, the message specified by the selected data descriptor through the data communications network further comprises transmitting the message using dynamic routing.

16. The computer program product of claim 13 wherein:
the particular message type is a control message type;
the injection FIFO buffer is maintained by the origin DMA engine exclusively for messages of the control message type and assigned a processing priority.

17. The computer program product of claim 13 further comprising computer program instructions capable of configuring the injection FIFO buffer and the plurality of shadow buffers in dependence upon configuration criteria.

18. The computer program product of claim 13 wherein the origin compute node and the target compute node are comprised in a parallel computer, the parallel computer comprising a plurality of compute nodes connected for data communications through the data communications network, the data communications network optimized for point to point data communications.

* * * * *